United States Patent
Ito

(10) Patent No.: US 12,017,650 B2
(45) Date of Patent: Jun. 25, 2024

(54) VEHICLE SPEED CONTROL DEVICE

(71) Applicant: ISUZU MOTORS LIMITED, Tokyo (JP)

(72) Inventor: Yuta Ito, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 337 days.

(21) Appl. No.: 17/442,607

(22) PCT Filed: Mar. 23, 2020

(86) PCT No.: PCT/JP2020/012584
§ 371 (c)(1),
(2) Date: Sep. 23, 2021

(87) PCT Pub. No.: WO2020/196358
PCT Pub. Date: Oct. 1, 2020

(65) Prior Publication Data
US 2022/0169248 A1 Jun. 2, 2022

(30) Foreign Application Priority Data
Mar. 27, 2019 (JP) ................................. 2019-061594

(51) Int. Cl.
*B60W 30/16* (2020.01)
*B60W 30/18* (2012.01)

(52) U.S. Cl.
CPC ....... *B60W 30/16* (2013.01); *B60W 30/18136* (2013.01); *B60W 2530/16* (2013.01); *B60W 2554/802* (2020.02)

(58) Field of Classification Search
CPC ......... B60T 8/00; B60W 10/06; B60W 10/18; B60W 10/184; B60W 10/196;
(Continued)

(56) References Cited

U.S. PATENT DOCUMENTS 6,628,197 B1 * 9/2003 Poguntke .................. B60T 8/00
340/463
2006/0100768 A1 * 5/2006 Lock ..................... B60W 10/06
701/93
(Continued)

FOREIGN PATENT DOCUMENTS

JP 08-091188 A 4/1996
JP H1120496 A 1/1999
(Continued)

OTHER PUBLICATIONS

International Search Report from International Application No. PCT/JP2020/012584, dated Jun. 16, 2020.

*Primary Examiner* — Peter D Nolan
*Assistant Examiner* — Ce Li Li
(74) *Attorney, Agent, or Firm* — Shih IP Law Group, PLLC

(57) ABSTRACT

The objective of the present invention is to provide a vehicle speed control device which makes it easier to match an actual vehicle speed to a target vehicle speed, thereby providing an improved driving sensation and limiting the use of a main brake on downhill gradients. This vehicle speed control device for controlling the vehicle speed of a vehicle provided with a plurality of auxiliary brakes includes: a computing unit for computing a required deceleration torque on the basis of a running resistance of the vehicle; and a control unit for selecting an auxiliary brake to be operated, from among the plurality of auxiliary brakes, in accordance with the deceleration torque, and causing the selected auxiliary brake to operate.

4 Claims, 5 Drawing Sheets

(58) Field of Classification Search
CPC .. B60W 10/198; B60W 30/143; B60W 30/16; B60W 30/18136; B60W 2520/105; B60W 2530/16; B60W 2552/15; B60W 2554/40; B60W 2554/802; F02D 13/04; F02D 29/02; F02D 9/06
See application file for complete search history.

(56) References Cited

U.S. PATENT DOCUMENTS

| | | | |
|---|---|---|---|
| 2010/0088001 A1* | 4/2010 | Kato | B60W 10/198 701/93 |
| 2014/0011630 A1* | 1/2014 | Takahashi | B60W 10/08 180/65.265 |
| 2014/0316669 A1 | 10/2014 | Rudberg | |
| 2017/0129467 A1 | 5/2017 | Karlsson | |

FOREIGN PATENT DOCUMENTS

| | | |
|---|---|---|
| JP | 11-321606 A | 11/1999 |
| JP | H11301308 A | 11/1999 |
| JP | 2003-176733 A | 6/2003 |
| JP | 2003-341494 A | 12/2003 |
| JP | 2007-253715 A | 10/2007 |
| JP | 2008-279924 A | 11/2008 |
| JP | 2009029321 A | 2/2009 |
| JP | 2009-149173 A | 7/2009 |
| JP | 2010234987 A | 10/2010 |
| JP | 2015-000605 A | 1/2015 |
| JP | 2015-058926 A | 3/2015 |
| JP | 2017-520452 A | 7/2017 |

* cited by examiner

VEHICLE SPEED CONTROL DEVICE

TECHNICAL FIELD

The present invention relates to a vehicle speed control apparatus for controlling a vehicle speed of a vehicle including a plurality of auxiliary brakes.

BACKGROUND ART

Heretofore, a control apparatus has been known, which provides an upper limit of deviation from a set vehicle speed and activates an auxiliary brake when the vehicle speed exceeds this upper limit of the deviation.

Patent Literature (hereinafter, referred to as "PTL") 1 discloses a control apparatus that calculates a target value of deceleration torque in accordance with a vehicle driving state, and activates an appropriate engine brake in accordance with the vehicle driving state by controlling the drive of a valve drive mechanism in accordance with the calculated target value.

CITATION LIST

Patent Literature

PTL 1: Japanese Patent Application Laid-Open No. 2003-176733

SUMMARY OF INVENTION

Technical Problem

The conventional control apparatus, however, involves a problem of causing poor driving feeling due to occurrence of a large deviation from the set vehicle speed and/or hunting of the vehicle speed because the auxiliary brake does not operate properly mainly on a downward slope and/or the like.

An object of the present disclosure is thus to provide a vehicle speed control apparatus capable of making driving feeling favorable and of suppressing use of a main brake on a downward slope by enabling an actual vehicle speed to easily match with a target vehicle speed.

Solution to Problem

A vehicle speed control apparatus according to one aspect of the present disclosure is an apparatus that controls a vehicle speed of a vehicle including a plurality of auxiliary brakes, the apparatus including: an arithmetic section that computes a deceleration torque being required, based on a traveling resistance of the vehicle; and a control section that selects at least one of the plurality of auxiliary brakes to be activated from among the plurality of auxiliary brakes, in accordance with the deceleration torque, and activates the selected at least one of the plurality of auxiliary brakes.

Advantageous Effects of Invention

According to the present disclosure, enabling an actual vehicle speed to easily match with a target vehicle speed makes it possible to make driving feeling favorable and to suppress use of a main brake on a downward slope

DESCRIPTION OF EMBODIMENTS

Hereinafter, a detailed description will be given of an embodiment of the present disclosure with reference to the accompanying drawings.

<Configuration of Vehicle Speed Control Apparatus>

Figure 1:
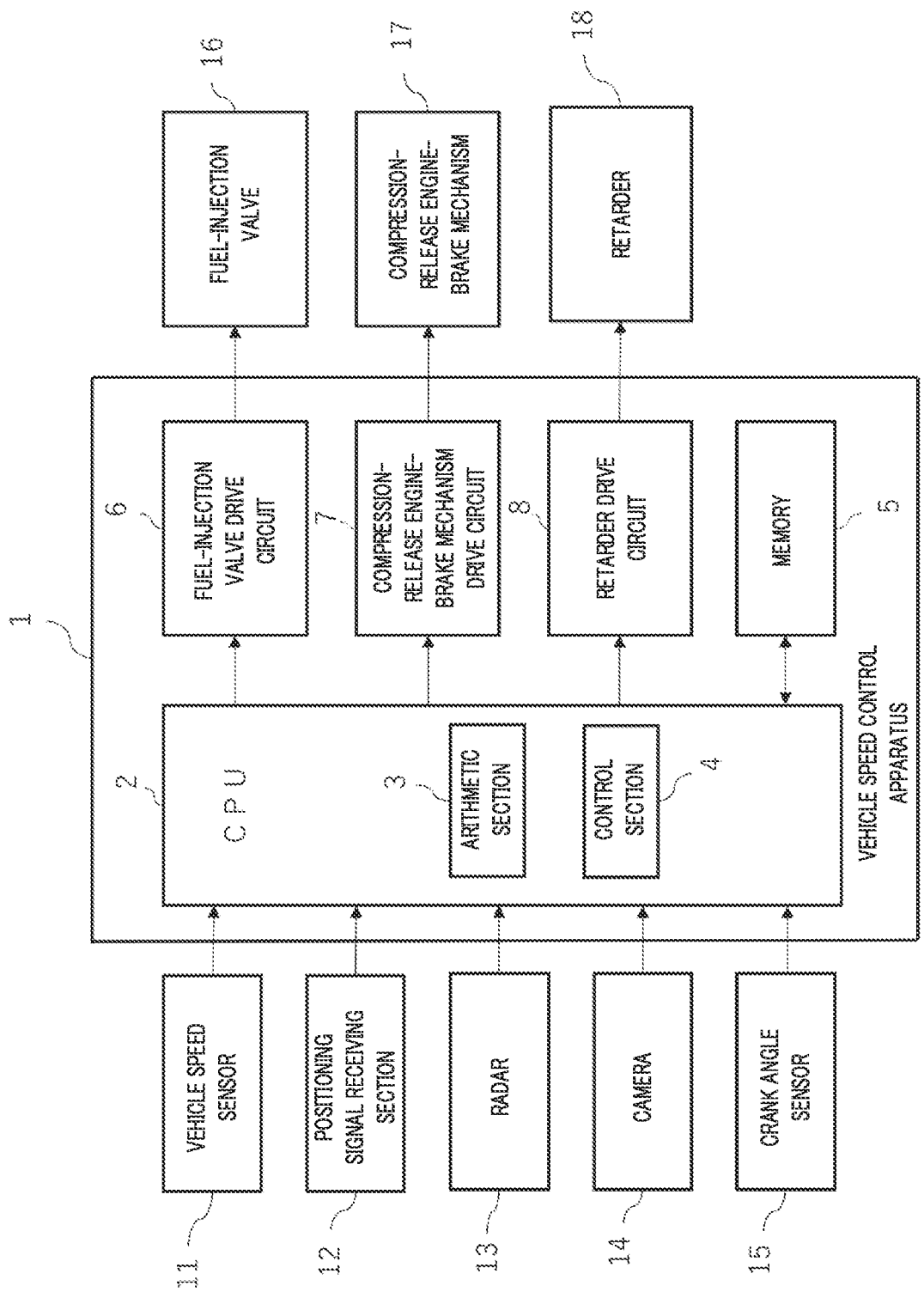
FIG. 1 is a block diagram illustrating a configuration of a vehicle speed control apparatus according to an embodiment of the present disclosure.

A detailed description will be given below of vehicle speed control apparatus 1 according to the embodiment of the present disclosure with reference to FIG. 1.

Vehicle speed control apparatus 1 is formed of an electronic control device, such as Electronic Control Unit (ECU), and mounted on a vehicle in which a drive force of an engine (not illustrated) is transmitted to a driving wheel.

More specifically, vehicle speed control apparatus 1 includes Central Processing Unit (CPU) 2, memory 5, fuel-injection valve actuation circuit 6, compression-release engine-brake mechanism activation circuit 7, and retarder activation circuit 8. CPU 2 includes arithmetic section 3 and control section 4. Arithmetic section 3 and control section 4 are configured as functional blocks at the time of executing a control program in CPU 2, but these components may be configured as electric circuits as appropriate.

Arithmetic section 3 computes a required deceleration torque (hereinafter, simply referred to as "deceleration torque") based on: an electric signal in accordance with a vehicle speed of a vehicle inputted from vehicle speed sensor 11; a positioning signal received from a positioning satellite inputted from positioning signal receiving section 12; an electric signal in accordance with the intensity of a reflected wave of a radio wave emitted around the vehicle inputted from radar 13; and an image signal of an image around the vehicle inputted from camera 14; and information stored in memory 5.

Control section 4 computes an engine speed (the number of revolutions of engine) speed based on an electric signal in accordance with a crank angle of the engine inputted from crank angle sensor 15. Further, control section 4 computes the number of rotations of an output shaft of a transmission based on a frequency of a pulse signal in accordance with rotation of the output shaft of the transmission inputted from a pulse sensor (not illustrated). Further, control section 4 computes a braking force of each auxiliary brake based on the engine speed and the number of rotations of the output shaft of the transmission, for example. Control section 4 outputs a control signal for actuating an auxiliary brake selected from among a plurality of auxiliary brakes mounted on the vehicle, in accordance with the computed braking force of each of the plurality of auxiliary brakes and the deceleration torque computed by arithmetic section 3, to fuel-injection valve actuation circuit 6, compression-release engine-brake mechanism activation circuit 7, or retarder activation circuit 8. The auxiliary brakes herein are an engine brake, a compression release engine brake, and a retarder. Note that, the auxiliary brakes are not limited to the brakes mentioned above, and it is possible to use an optional vehicle-mountable brake, such as an exhaust brake other than the main brake.

Memory 5 stores in advance a control program executed by CPU 2 and three-dimensional map information including gradient information. Memory 5 stores therein a threshold value, which will be described later and used when each auxiliary brake is actuated.

Fuel-injection valve actuation circuit 6 operates by a control signal inputted from control section 4 and controls actuation of fuel-injection valve 16.

Compression-release engine-brake mechanism activation circuit 7 operates by a control signal inputted from control section 4 and controls activation of compression-release engine-brake mechanism 17.

Retarder activation circuit 8 operates by a control signal inputted from control section 4 and controls activation of retarder 18.

<Operation of Vehicle Speed Control Apparatus>

The operation of vehicle speed control apparatus 1 according to the embodiment of the present disclosure will be described in detail below with reference to FIGS. 1 to 4.

Figure 2:
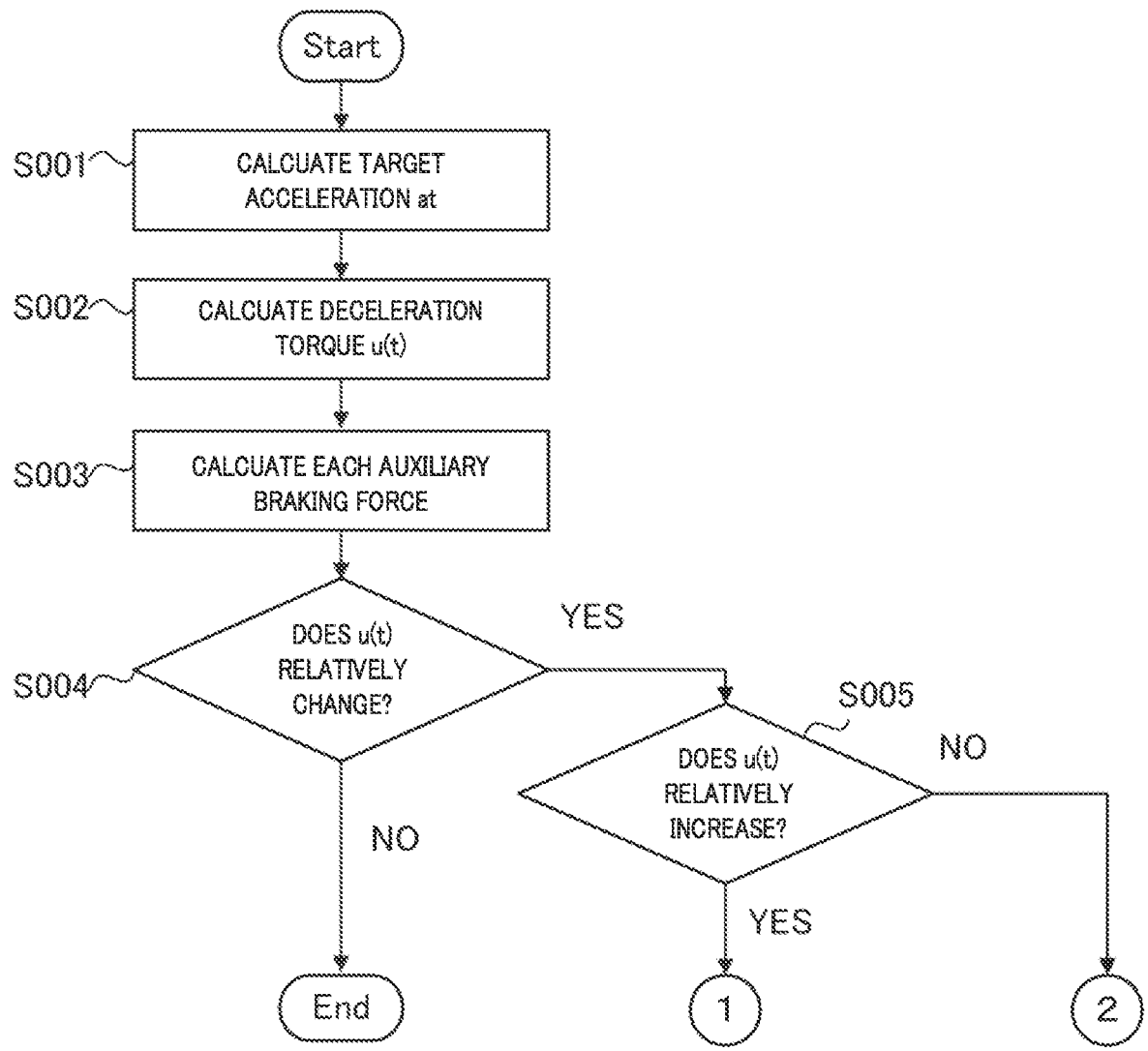
FIG. 2 is a flowchart illustrating an operation of the vehicle speed control apparatus according to the embodiment of the present disclosure.
Figure 3:
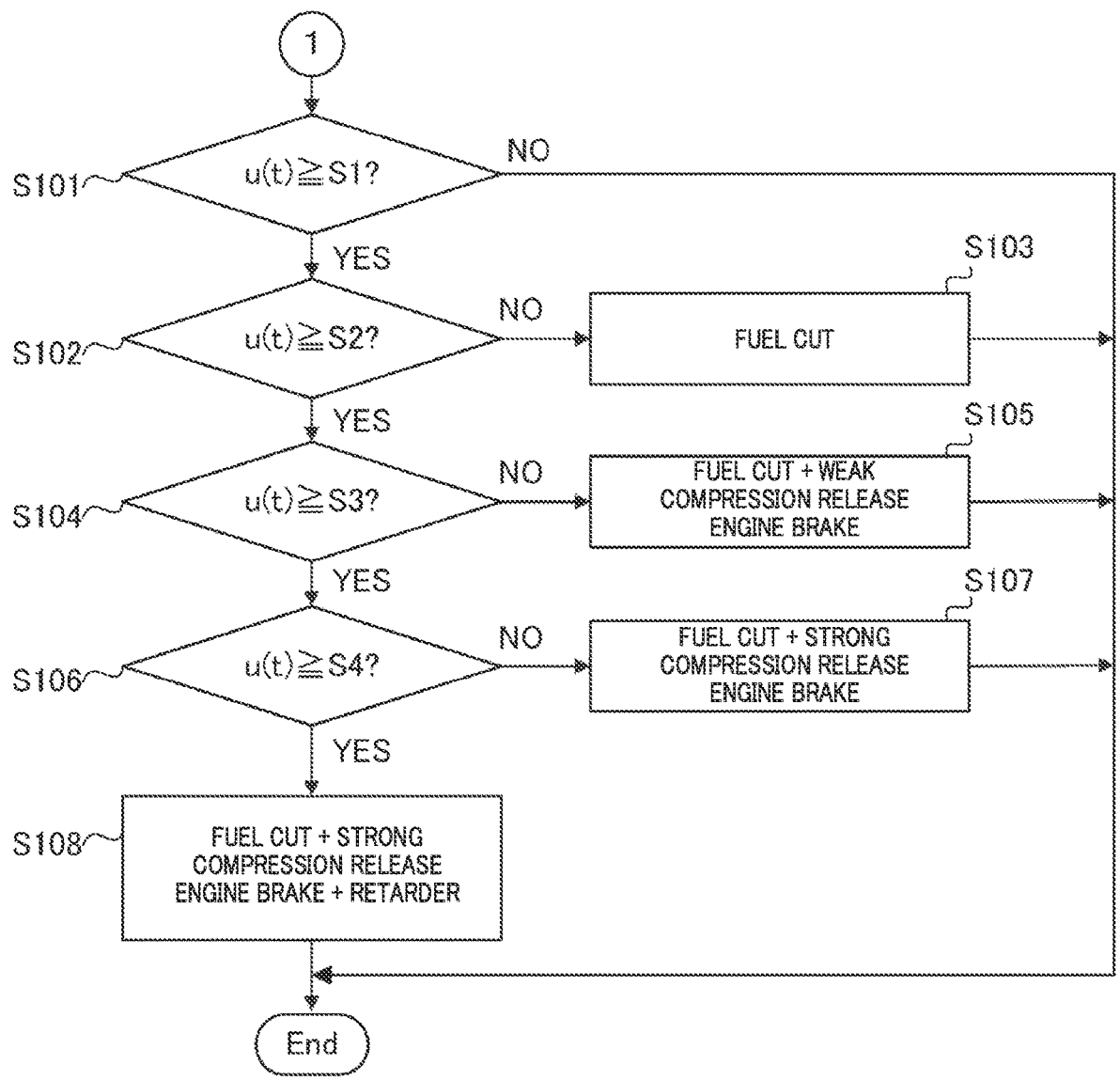
FIG. 3 is a flowchart illustrating an operation of the vehicle speed control apparatus according to the embodiment of the present disclosure.
Figure 4:
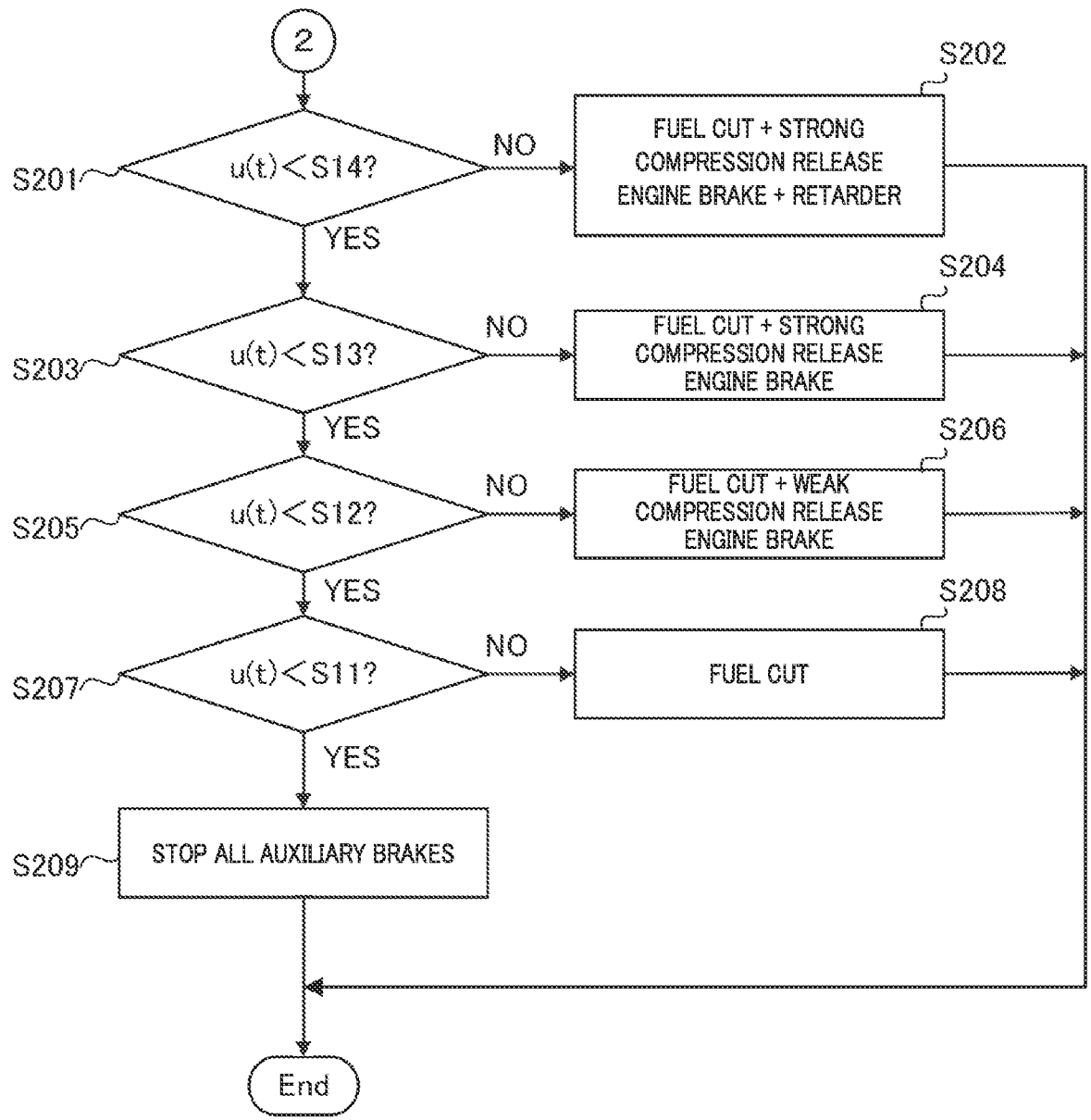
FIG. 4 is a flowchart illustrating an operation of the vehicle speed control apparatus according to the embodiment of the present disclosure.

Vehicle speed control apparatus 1 repeatedly performs an operation illustrated in FIGS. 2 to 4 at a predetermined control cycle until an operation to stop the vehicle speed control is performed.

First, when the vehicle travels alone, arithmetic section 3 of CPU 2 computes a current vehicle speed based on an electric signal inputted from vehicle speed sensor 11 and sets a target vehicle speed while computing target acceleration $a_t$ by a Proportional-Integral-Differential (PID) control or the like using the current vehicle speed and the target vehicle speed. Further, when the vehicle travels by following a forward vehicle by performing Adaptive Cruise Control (ACC) (constant speed traveling and/or vehicle-to-vehicle distance control), arithmetic section 3 computes target acceleration at using various publicly known logics (S001). When ACC is performed, the CPU also functions as a following state detecting section which is a functional section for detecting the following state of the vehicle to a preceding vehicle, for example, whether or not the vehicle follows the preceding vehicle. Note that, a vehicle capable of performing ACC includes sensors, such as a camera or millimeter-wave radar, each being capable of detecting a situation around the vehicle and being mounted on the vehicle, and the CPU and these sensors are connected to each other, as a matter of course.

Next, arithmetic section 3 computes deceleration torque u(t) through calculation based on various detection values thus inputted and a value stored in memory 5 (S002).

More specifically, arithmetic section 3 computes deceleration torque u(t), using Equation 1.

$$u(t)=(rd/(i\times\eta))\times((\lambda\times S\times V^2)+(m\times g\times(\mu+\sin\theta))+((m+\Delta m)\times at)) \quad \text{(Equation 1)}$$

In Equation 1, "rd" represents the effective radius of a tire, "i" represents the total deceleration ratio in accordance with a transmission gear, "η" represents the transmission efficiency, "λ" is the air resistance coefficient, "S" represents the front projection area of the vehicle, "V" represents the vehicle speed, "m" represents the vehicle weight, "g" represents the gravity acceleration, "μ" represents the rolling resistance coefficient, "θ" represents the slope of the road surface, "Δm" represents the inertial weight of a driving mechanism rotating section and "at" represents the target acceleration.

In Equation 1, "λ×S×V²" represents the pneumatic resistance, "m×g×μ" represents the rolling resistance, "m×g×sin θ" represents the gradient resistance, and "(m+Δm)×at" represents the acceleration resistance. These air resistance, rolling resistance, gradient resistance and acceleration resistance become the traveling resistance of the vehicle. The values of "rd," "i," "η," "λ," "S," "μ," and "Δm" in Equation 1 are stored in advance in memory 5.

Arithmetic section 3 computes each value not stored in memory 5 in Equation 1. More specifically, arithmetic section 3 computes vehicle speed V based on an electric signal inputted from vehicle speed sensor 11. Arithmetic section 3 computes the current position based on a positioning signal inputted from positioning signal receiving section 12 and computes gradient θ at the current position with reference to the three-dimensional map information stored in memory 5. When the three-dimensional map information cannot be referenced, gradient θ is estimated using a signal or the like inputted from the acceleration sensor. Arithmetic section 3 estimates vehicle weight m using a publicly known logic.

Arithmetic section 3 computes deceleration torque u(t) by Equation 1 using each value stored in memory 5 and using each value calculated and estimated by the above.

Figure 5:
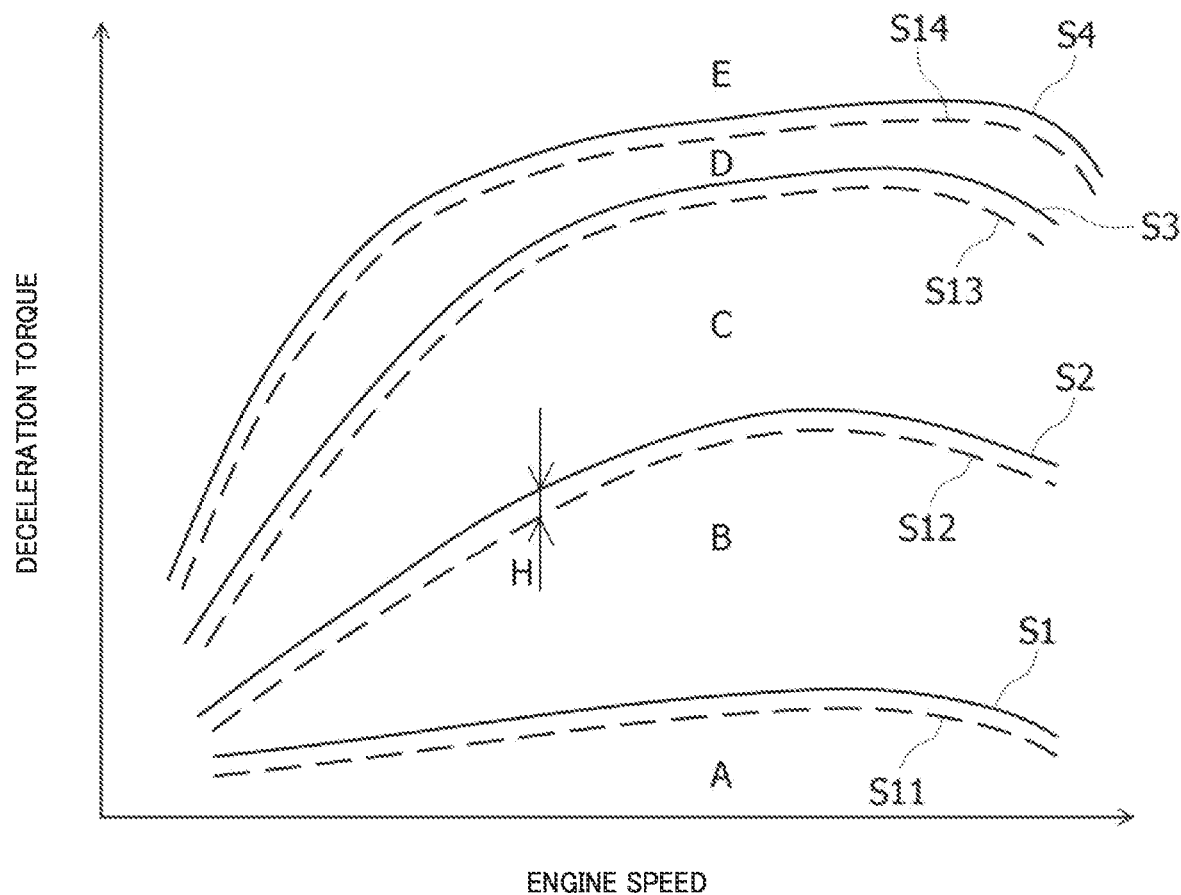
FIG. 5 is a diagram illustrating a relationship between an engine speed and a deceleration torque used in the vehicle speed control apparatus according to the embodiment of the present disclosure.

Next, control section 4 computes a braking force of each auxiliary brake through calculation (S003). More specifically, control section 4 computes the engine speed and the number of rotations of the output shaft of the transmission and computes the threshold values of S1 to S4 and S11 to S14 illustrated in FIG. 5, as the braking forces of the respective auxiliary brakes with the computed engine speed and the computed number of rotations of the output shaft of the transmission. Then, control section 4 stores the computed threshold values in memory 5.

Here, threshold value S11 has a hysteresis in a decreasing direction of the deceleration torque with respect to threshold value S1, and threshold value S12 has a hysteresis in the decreasing direction of the deceleration torque with respect to threshold value S2. Further, threshold value S13 has a hysteresis in the decreasing direction of the deceleration torque with respect to threshold value S3, and threshold value S14 has a hysteresis in the decreasing direction of the deceleration torque with respect to threshold value S4. Thus, it is possible to prevent the auxiliary brakes that have been activated or strengthened from immediately stopping or weakening the activation.

Further, control section 4 adjusts a width of the hysteresis in accordance with the following state of the vehicle to the preceding vehicle. When the vehicle travels by following a forward vehicle by executing ACC, for example, control section 4 increases width H of the hysteresis compared with the case where the vehicle travels without following a forward vehicle. Thus, when the vehicle travels by following a forward vehicle, it is possible to prevent the behavior of the vehicle from being unstable due to repetitions of activation of an auxiliary brake and non-activation of an auxiliary brake, which occur when the vehicle is influenced by the vehicle speed of the forward vehicle whose behavior cannot be predicted.

Furthermore, in the case of not traveling by following a forward vehicle, control section 4 decreases width H of the hysteresis when detecting a downward slope of a road surface based on the positioning signal inputted from positioning signal receiving section 12 and on the map information stored in memory 5, as compared with the case of detecting no downward slope. This makes it possible to suppress the generation of an unnecessary deceleration force.

Note that control section 4 is capable of changing width H of the hysteresis in accordance with an optional condition other than the conditions described above without limitations to the case of changing width H of the hysteresis in accordance with the above conditions.

Next, control section 4 determines whether or not deceleration torque u(t) relatively changes (S004). When deceleration torque u(t) relatively changes, one of the following two cases applies. One is when the value of deceleration torque u(t) computed last time is different from the value of deceleration torque u(t) computed this time. The other is a case where the braking force obtained by each auxiliary brake changes due to changes in the engine speed, the number of rotations of the output shaft of the transmission, the road gradient or the like, the vehicle and the conditions around the vehicle although the value of deceleration torque u(t) computed last time is equal to the value of deceleration torque u(t) computed this time.

Control section 4 ends the operation when there is no relative change in deceleration torque u(t) (S004: NO).

Meanwhile, control section 4 determines whether deceleration torque u(t) relatively increases (S005) when there is a relative change in deceleration torque u(t) (S004: YES). When deceleration torque u(t) relatively increases, one of the following two cases applies. One is a case where the value of deceleration torque u(t) computed this time is greater than the value of deceleration torque u(t) computed last time. The other is a case where the braking force obtained by each auxiliary brake is reduced due to changes in the engine speed, the number of rotations of the output shaft of transmission, the road gradient or the like, the vehicle and the conditions around the vehicle although the value of deceleration torque u(t) computed last time is equal to the value of deceleration torque u(t) computed this time.

Control section 4 determines whether deceleration torque u(t) is equal to or greater than threshold S1 (S101) when deceleration torque u(t) relatively increases (S005: YES).

Control section 4 ends the operation without application of the control to activate any auxiliary brake when deceleration torque u(t) is less than threshold value S1 (S101: NO) because deceleration torque u(t) has relatively increased within the range of region A illustrated in FIG. 5, and the state has changed from the state where no auxiliary brakes are activated to the state where activation of any auxiliary brakes is unnecessary.

Meanwhile, control section 4 determines whether or not deceleration torque u(t) is equal to or greater than threshold value S2 (S102), when deceleration torque u(t) is equal to or greater than threshold value S1 (S101: YES).

When deceleration torque u(t) is less than threshold value S2 (S102: NO), control section 4 outputs a control signal for stopping the injection of fuel (fuel cut) to obtain the braking force of the engine brake to fuel-injection valve actuation circuit 6 (S103) and then ends the operation because deceleration torque u(t) is within the range of area B illustrated in FIG. 5.

Meanwhile, control section 4 determines whether or not deceleration torque u(t) is equal to or greater than threshold value S3 (S104), when deceleration torque u(t) is equal to or greater than threshold value S2 (S102: YES).

When deceleration torque u(t) is less than threshold value S3 (S104: NO), control section 4 outputs a control signal for obtaining a weak braking force of the compression release engine brake to compression-release engine-brake mechanism activation circuit 7 (S105) in addition to the fuel cut and then ends the operation because deceleration torque u(t) is within the range of area C illustrated in FIG. 5. In order to obtain a weak braking force of the compression release engine brake, herein, for example, assuming that the maximum braking force of the compression release engine brake is 100%, the braking force of the compression release engine brake is set to 50%. Note that, in order to obtain a weak braking force of the compression release engine brake, it is possible to adopt any value other than 0% or 100% without limitations to the case of setting the brake force of the compression release engine brake to 50%.

Meanwhile, control section 4 determines whether or not deceleration torque u(t) is equal to or greater than threshold value S4 (S106), when the deceleration torque u(t) is equal to or greater than the threshold value S3 (S104: YES).

When the deceleration torque u(t) is less than threshold value S4 (S106: NO), control section 4 outputs a control signal for obtaining a strong braking force of the compression release engine brake to compression-release engine-brake mechanism activation circuit 7 (S107) in addition to the fuel cut and then ends the operation because deceleration torque u(t) is within the range of area D illustrated in FIG. 5. In order to obtain a strong braking force of the compression release engine brake, herein, for example, assuming that the maximum braking force of the compression release engine brake is 100%, the braking force of the compression release engine brake is set to 100%. Note that, in order to obtain a strong braking force of the compression release engine brake, it is possible to adopt any value as long as the braking force is greater than the braking force of the case of obtaining a weak braking force of the compression release engine brake without limitations to the case of setting the braking force of the compression release engine brake to 100%.

Meanwhile, when deceleration torque u(t) is equal to or greater than threshold value S4 (S106: YES), control section 4 outputs a control signal for obtaining a braking force of the retarder in addition to the fuel cut and a strong braking force of the compression release engine brake to retarder activation circuit 8 (S108) and then ends the operation because deceleration torque u(t) is within the range of area E illustrated in FIG. 5.

Control section 4 determines whether deceleration torque u(t) is less than threshold value S14 (S201) when deceleration torque u(t) relatively decreases (S005: NO).

When deceleration torque u(t) is not less than threshold value S14 (S201: NO), control section 4 performs the fuel cut and keeps a strong braking force of the compression release engine brake and a braking force of the retarder (S202) and then ends the operation because deceleration torque u(t) is within the range of area E illustrated in FIG. 5.

Meanwhile, control section 4 determines whether deceleration torque u(t) is less than threshold value S13 (S203) when deceleration torque u(t) is less than threshold value S14 (S201: YES).

When deceleration torque u(t) is not less than threshold S13 (S203: NO), control section 4 performs the fuel cut and keeps a strong braking force of the compression release engine brake (S204) and then ends the operation because deceleration torque u(t) is within the range of area D illustrated in FIG. 5.

Meanwhile, control section 4 determines whether deceleration torque u(t) is less than threshold value S12 (S205) when deceleration torque u(t) is less than threshold value S13 (S203: YES).

When deceleration torque u(t) is not less than threshold S12 (S205: NO), control section 4 performs the fuel cut and keeps a weak braking force of the compression release engine brake (S206) and then ends the operation because deceleration torque u(t) is within the range of area C illustrated in FIG. 5.

Meanwhile, control section 4 determines whether deceleration torque u(t) is less than threshold value S11 (S207) when deceleration torque u(t) is less than threshold value S12 (S205: YES).

When deceleration torque u(t) is not less than threshold value S11 (S207: NO), control section 4 performs the fuel cut (S208) and then ends the operation because deceleration torque u(t) is within the range of area B illustrated in FIG. 5.

Meanwhile, when deceleration torque u(t) is less than threshold value S11 (S207: YES), control section 4 stops activation of all the auxiliary brakes (S209) and then ends the operation because deceleration torque u(t) is within the range of area A illustrated in FIG. 5.

As described above, according to the present embodiment, computing a required deceleration torque based on a traveling resistance of a vehicle and activating an auxiliary brake selected from among a plurality of auxiliary brakes in accordance with the deceleration torque enables easily matching an actual vehicle speed with a target vehicle speed, thereby making it possible to make the feeling of driving favorable and to prevent use of a main brake on a downward slope.

In the present disclosure, types, arrangement, and the number of components, for example, are not limited to those in the embodiment described above. Thus, a variation and/or modification, such as replacement of a component with another that brings about the equivalent operational effects, is possible as appropriate without departure from the gist of the present disclosure.

This application is based on Japanese Patent Application No. 2019-061594, filed on Mar. 27, 2019, the contents of which are incorporated herein by reference in its entirety.

INDUSTRIAL APPLICABILITY

The vehicle speed control apparatus according to the present invention is suitable for controlling the vehicle speeds of vehicles each including a plurality of auxiliary brakes.

REFERENCE SIGNS LIST

1 Vehicle speed control apparatus
2 CPU
3 Arithmetic section
4 Control section
5 Memory
6 Fuel-injection valve actuation circuit
7 Compression-release engine-brake mechanism activation circuit
8 Retarder activation circuit
11 Vehicle speed sensor
12 Positioning signal receiving section
13 Radar
14 Camera
15 Crank angle sensor
16 Fuel injection valve
17 Compression-release engine-brake mechanism
18 Retarder

What is claimed is:

1. A vehicle speed control apparatus that controls a vehicle speed of a vehicle including a plurality of auxiliary brakes, the vehicle speed control apparatus comprising:
an arithmetic section that computes a deceleration torque being required, based on a traveling resistance of the vehicle; and
a control section that stores in advance a map showing a relationship between a plurality of first regions and the plurality of auxiliary brakes and between a plurality of second regions and the plurality of auxiliary brakes, selects at least one of the plurality of auxiliary brakes to be activated from among the plurality of auxiliary brakes by referring to the map based on the deceleration torque, and activates the selected at least one of the plurality of auxiliary brakes, the plurality of first regions being regions in which a value of the deceleration torque changing in accordance with an engine speed is classified by a plurality of first threshold values, the plurality of second regions being regions in which the value of the deceleration torque is classified by a plurality of second threshold values having a hysteresis in a decreasing direction of the deceleration torque with respect to the plurality of first threshold value, wherein the control section selects the at least one of the plurality of auxiliary brakes set in a specific one of the plurality of first regions which correspond to the deceleration torque when the deceleration torque is increasing relative to the deceleration torque computed last time, and the control section selects the at least one of the plurality of auxiliary brakes set in a specific one of die plurality of second regions which corresponds to the deceleration torque when the deceleration torque is decreasing relative to the deceleration torque computed last time.

2. The vehicle speed control apparatus according to claim 1, further comprising:
a following state detection section that detects a following state of the vehicle to a preceding vehicle, wherein
the control section adjusts a width of the hysteresis of the plurality of second threshold values with respect to the plurality of first threshold values in accordance with the following state of the vehicle to the preceding vehicle.

3. The vehicle speed control apparatus according to claim 2, wherein the control section increases the width of the hysteresis of the plurality of second threshold values with respect to the plurality of first threshold values in a case where the vehicle follows the preceding vehicle as compared with a case where the vehicle does not follow the preceding vehicle.

4. The vehicle speed control apparatus according to claim 2, wherein the control section decreases the width of the hysteresis of the plurality of second threshold values with respect to the plurality of first threshold values in a case where a downward slope of a road surface is detected while the vehicle does not follow the preceding vehicle, as compared with a case where no downward slope of the road surface is detected.

* * * * *